US008755285B2

(12) United States Patent
Zhang (10) Patent No.: US 8,755,285 B2
(45) Date of Patent: Jun. 17, 2014

(54) METHOD, SYSTEM AND APPARATUS FOR DIAGNOSING PHYSICAL DOWNLINK FAILURE

(75) Inventor: Panke Zhang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 379 days.

(21) Appl. No.: 13/389,355

(22) PCT Filed: Jul. 20, 2010

(86) PCT No.: PCT/CN2010/075281
§ 371 (c)(1),
(2), (4) Date: Feb. 17, 2012

(87) PCT Pub. No.: WO2011/035640
PCT Pub. Date: Mar. 31, 2011

(65) Prior Publication Data
US 2012/0147757 A1   Jun. 14, 2012

(30) Foreign Application Priority Data

Sep. 28, 2009   (CN) .......................... 2009 1 0176076

(51) Int. Cl.
*G01R 31/08* (2006.01)
*H04B 17/00* (2006.01)
*H04L 12/24* (2006.01)
*H04W 24/08* (2009.01)

(52) U.S. Cl.
CPC ........ *H04B 17/0062* (2013.01); *H04L 12/2419* (2013.01); *H04W 24/08* (2013.01)
USPC ............................ 370/241; 370/242; 370/252

(58) Field of Classification Search
USPC ......................................... 370/241, 242, 252
See application file for complete search history.

(56) References Cited

U.S. PATENT DOCUMENTS

| 2006/0133283 A1* | 6/2006 | Weiner et al. ................. 370/241 |
| 2008/0104454 A1* | 5/2008 | White .............................. 714/48 |
| 2010/0095163 A1* | 4/2010 | Ishihara et al. ................ 714/47 |

FOREIGN PATENT DOCUMENTS

| CN | 1725716 A | 1/2006 |
| CN | 1815970 A | 8/2006 |
| CN | 101667864 A | 3/2010 |
| JP | 2005033665 A | 2/2005 |
| WO | 2009088225 A2 | 7/2009 |

OTHER PUBLICATIONS

International Search Report for PCT/CN2010/075281 dated Sep. 28, 2010.

* cited by examiner

*Primary Examiner* — Kibrom T Hailu
*Assistant Examiner* — Zewdu A Beyen
(74) *Attorney, Agent, or Firm* — Ling Wu; Stephen Yang; Ling and Yang Intellectual Property LLC (57) ABSTRACT

The present invention discloses a method for diagnosing a physical downlink failure so as to solve the problem in the existing technology of being unable to report information accurately when the physical downlink failure occurs thereby influencing the diagnosis of the physical downlink failure. The method comprises: when a remote device detects the physical downlink failure, determining a code corresponding to information required to be reported based on a stored corresponding relationship between the information and the code; the remote device generating a control signal from the determined code based on an appointed frequency clock; and the remote device reporting a signal corresponding to the control signal to a near-end device through a physical uplink such that the near-end device diagnoses the physical downlink failure according to the reported signal.

4 Claims, 4 Drawing Sheets

METHOD, SYSTEM AND APPARATUS FOR DIAGNOSING PHYSICAL DOWNLINK FAILURE

TECHNICAL FIELD

The present invention relates to the field of communication technology, and in particular, to a method, system and apparatus for diagnosing a physical downlink failure.

BACKGROUND OF THE RELATED ART

In the wireless communication system, often there are cases that devices are interconnected to constitute a network. These devices are interconnected through physical mediums, such as optical fibers, cables, etc. Generally two physical links are required to implement the interconnection, one is a physical downlink, that is, a link from a near-end device to a remote device; the other is a physical uplink, that is, a link from a remote device to a near-end device. When interruption occurs in these physical links due to anomaly, the normal operation of the system will be influenced. In order to locate the failure rapidly and accurately and maintain the links, a method for accurately and reliably detecting the physical link failures is required to be provided.

At present, in the wireless communication system, there are many common methods for detecting the physical link failure. Interruption of the physical uplink generally can be detected more easily. For example, interruption of an optical fiber can be determined based on an aphotic indication of an optical receiving module; interruption of a cable can be determined based on the existence or nonexistence of a signal. However, in the case of interruption of the physical downlink, generally information is required to be reported by the physical uplink and then the physical downlink is detected based on the reported information.

However, when the failure occurs in the physical downlink, even in the case that the physical downlink has been interrupted as the device is on, the remote device is unable to recover a line clock normally. Therefore a phase-locked loop of the remote device loses lock due to loss of reference time, and generally the physical uplink also becomes instable such that its reported failure information or some other important information possibly can not correctly reach the near-end device. So the existing method for detecting the physical downlink failure often can only determine that there are problems in the physical link, but can not determine whether the physical downlink failure or other reasons cause instability of the physical downlink such that it is difficult to determine whether the failure occur in the physical downlink, thus increasing the complexity of maintenance and failure processing of the physical downlink. Generally the maintenance personnel may be required to arrive at site to determine whether the failure occur in the physical downlink using a dedicated test device.

CONTENT OF THE INVENTION

The present invention provides a method, system and apparatus for diagnosing a physical downlink failure so as to solve the problem in the existing technology of being unable to report information accurately when the physical downlink failure occurs thereby influencing the diagnosis of the physical downlink failure.

The present invention provides a method for diagnosing a physical downlink failure comprising:

when a remote device detects the physical downlink failure, determining a code corresponding to information required to be reported based on a stored corresponding relationship between the information and the code;

the remote device generating a control signal from the determined code based on an appointed frequency clock; and the remote device reporting a signal corresponding to the control signal to a near-end device through a physical uplink such that the near-end device diagnoses the physical downlink failure according to the reported signal.

The present invention provides a system for diagnosing a physical downlink failure comprising a remote device and a near-end device; wherein the remote device is configured to, when detecting the physical downlink failure, determine a code corresponding to information required to be reported based on a stored corresponding relationship between the information and the code, generate a control signal from the determined code based on an appointed frequency clock and report a signal corresponding to the control signal to a near-end device through a physical uplink; and the near-end device is configured to diagnose the physical downlink failure according to the reported signal.

The present invention provides an apparatus for reporting information, which is located in a remote device and comprises a determining unit, a generating unit and a reporting unit; wherein the determining unit is configured to, when detecting the physical downlink failure, determine a code corresponding to information required to be reported based on a stored corresponding relationship between the information and the code;

the generating unit is configured to generate a control signal from the determined code based on an appointed frequency clock; and the reporting unit is configured to report a signal corresponding to the control signal to a near-end device through a physical uplink.

The present invention provides an apparatus for diagnosing a physical downlink failure, which is located in a near-end device and comprises a diagnosis unit configured to diagnose the physical downlink failure according to a reported signal.

In the diagnosis process of the physical downlink failure in accordance with the present invention, when the remote device detects the physical downlink failure, it determines the code corresponding to the information to be reported based on the stored corresponding relationship between the information and the code, generates the control signal from the determined code based on the appointed frequency clock, and reports the signal corresponding to the control signal to the near-end device through the physical uplink such that the near-end device can diagnose the physical downlink failure according to the reported signal. Therefore, when the physical downlink failure occurs, the remote device still can report the information accurately and reliably such that the near-end device can diagnose the failure to facilitate maintenance of the communication link.

PREFERRED EMBODIMENTS OF THE PRESENT INVENTION

In the wireless communication system in an embodiment of the present invention, a remote device and a near-end device are interconnected through two physical links, that is, a physical uplink and a physical downlink. The physical links include optical fiber links and cable links.

When the physical downlink is normal, the remote device receives signals from the physical downlink and recovers a line clock, and uses the recovered line clock as an input reference clock of a local phase-locked loop. The local phase-locked loop generates a sending clock based on the input reference clock. Thus, the remote device sends the signals to the near-end device through the physical uplink by using the sending clock.

When the failure occurs in the physical downlink, the remote device can neither receive the signals nor recover the line clock. Thus, the local phase-locked loop loses the input reference clock, and can not generate the sending clock. In the embodiment of the present invention, the remote device can report a signal corresponding to information to the near-end device through the physical uplink by using an appointed frequency clock such that the near-end device can diagnose the physical downlink failure according to the reported signal. The information includes link alarm information, device information or some other important information. The appointed frequency clock used between the remote device and the near-end device is generally a low frequency clock, which makes it easy for the near-end device to receive and analyze the signals.

Figure 1:
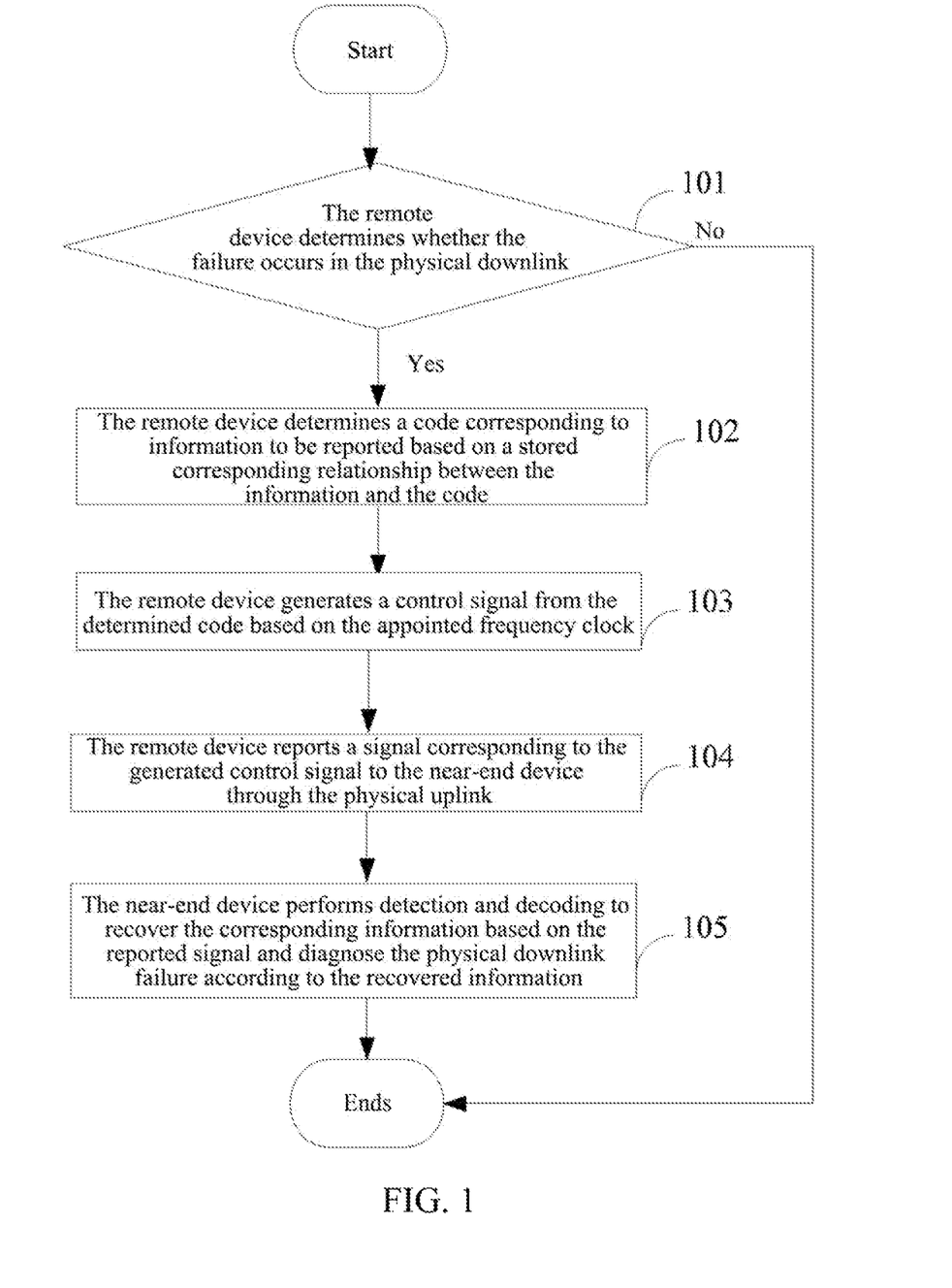
FIG. 1 is a flow chart of a process for diagnosing a physical downlink failure according to an embodiment of the present invention.

Referring to FIG. 1, the process for diagnosing a physical downlink-failure includes the following steps.

Step 101, the remote device determines whether the failure occurs in the physical downlink; and when determining that the failure occurs in the physical downlink, executes step 102; or else, the process for diagnosing the physical downlink failure ends.

Here, when the physical downlink is an optical fiber link, whether the failure occurs in the physical downlink is determined based on an aphotic indication of an optical receiving module, that is, when the optical receiving module does not receive an optical signal, it is determined that the failure occurs in the physical downlink and step 102 is executed; and when the optical receiving module receives the optical signals, it is determined that the physical downlink is normal and the process for diagnosing the physical downlink failure ends.

When the physical downlink is a cable link, whether the failure occurs in the physical link can be determined by detecting an electrical signal at a receiving port, that is, when the receiving port does not receive the electrical signal, it is determined that the failure occurs in the physical downlink and step 102 is executed; and when the receiving port receives the electrical signal, it is determined that the physical downlink is normal and the process for diagnosing the physical downlink failure ends.

Step 102, the remote device determines a code corresponding to information to be reported based on a stored corresponding relationship between the information and the code.

Here, the corresponding relationship between the information and the code is stored in the remote device, for example, device information corresponds to a code "01110000"; and alarm information corresponds to a code "01001100". Although the code can be set arbitrarily, it should be easy to resolve and detect as much as possible. Here, the information includes link alarm information, device information or some other important information.

Thus, when the failure occurs in the physical link, one or more pieces of information to be reported are determined according to practical application scenarios, failure type, etc. Thus, the code corresponding to the information to be reported can be determined based on the stored corresponding relationship between the information and the code.

Step 103, the remote device generates a control signal from the determined code based on the appointed frequency clock.

Here, if the frequency of the appointed frequency clock is f, the time corresponding to each bit of the determined code is $$t = \frac{1}{f}.$$

Figure 2:
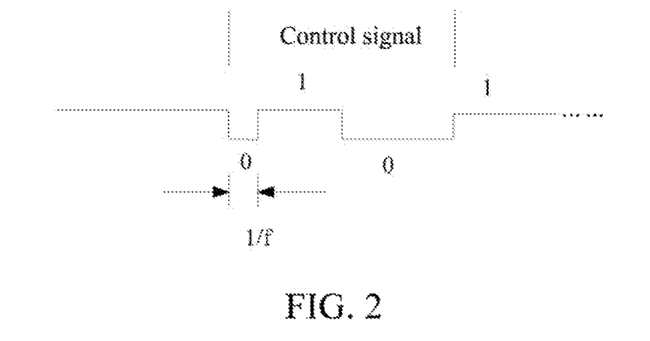
FIG. 2 is a schematic diagram of a control signal generated in an embodiment of the present invention.

Thus, the control signal with a certain duration can be generated. For example, if the determined code is "01110000", then the generated control signal, as shown in FIG. 2, includes "0" with a duration of $$\frac{1}{f},$$

"1" with a duration of $$\frac{3}{f}$$

and "0" with a duration of $$\frac{4}{f}.$$

Here, the appointed frequency clock may be a low frequency clock.

Step 104, the remote device reports a signal corresponding to the generated control signal to the near-end device through the physical uplink.

Here, when the physical uplink is an optical fiber link, the remote device controls turning off or turning on of an optical sending module based on the generated control signal so as to generate an optical signal corresponding to the control signal and then report it to the near-end device. Here, the generated control signal is shown in FIG. 2, its high level controls turning off of the optical sending module. As illustrated in FIG. 2, the optical sending module is turned on in a duration of $$\frac{1}{f},$$

that is, the optical signal is sent in a duration of $$\frac{1}{f};$$

the optical sending module is turned off in a duration of $$\frac{3}{f},$$

that is, the optical signal is not sent in a duration of $$\frac{3}{f};$$

and the optical sending module is turned on in a duration of $$\frac{4}{f},$$

that is, the optical signal is sent in a duration of $$\frac{4}{f}.$$

When the physical uplink is a cable link, the remote device controls turning of or turning on of a sending port according to the generated control signal so as to generate an electrical signal corresponding to the control signal and then report it to the near-end device. Here, the generated control signal is shown in FIG. 2, specifically, the sending port is turned on in a duration of $$\frac{1}{f},$$

that is, the electrical signal is sent in a duration of $$\frac{1}{f};$$

the sending port is turned of in a duration of $$\frac{3}{f},$$

that is, the electrical signal is not sent in a duration of $$\frac{3}{f};$$

and the sending port is turned on in a duration of $$\frac{4}{f},$$

that is, the electrical signal is sent in a duration of $$\frac{4}{f}.$$

Step 105, the near-end device diagnoses the physical downlink failure according to the reported signal.

Here, the near-end device monitors the physical uplink, and after detecting the reported signal, also recovers the received signal to the received code based on the appointed frequency clock, then determines information corresponding to the received code based on the stored corresponding relationship between the information and the code, and finally diagnoses the physical downlink failure according to the determined information.

For example, the frequency of the appointed frequency clock is still f, if the near-end device receives signals in a duration of $$\frac{1}{f},$$

does not receive signals in a duration of $$\frac{3}{f},$$

and receives signals in a duration of $$\frac{4}{f},$$

then the recovered received code is "01110000". Then the near-end device searches information corresponding to "01110000" based on the stored corresponding relationship between the information and the code, and finally diagnoses the physical downlink failure according to the searched information.

In the embodiment of the present invention, when the remote device needs to report a plurality of pieces of information, a time-sharing reporting method may be used, that is, whenever one piece of information is reported, another piece of information is reported after an a period of time, which makes it easy for the near-end device to monitor and recover the code.

Figure 3:
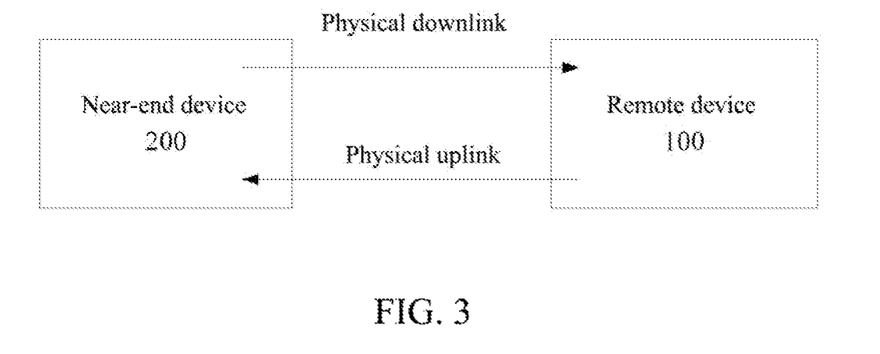
FIG. 3 is structure diagram of a system for diagnosing a physical downlink failure according to an embodiment of the present invention.

In the embodiment of the present invention, the system for diagnosing a physical downlink failure, as shown in FIG. 3, comprises a remote device 100 and a near-end device 200.

The remote device 100 is configured to, when detecting the physical downlink failure, determine a code corresponding to information to be reported based on a stored corresponding relationship between the information and the code, generate a control signal from the determined code based on an appointed frequency clock and report a signal corresponding to the control signal to the near-end device 200 through a physical uplink.

The near-end device 200 is configured to diagnose the physical downlink failure according to the reported signal.

The remote device 100 reporting the signal corresponding to the control signal to the near-end device through the physical uplink includes:

when the physical uplink is an optical fiber link, the remote device 100 controlling turning off or turning on of a optical sending module based on the generated control signal, and generating an optical signal corresponding to the control signal; and when the physical uplink is a cable link, the remote device 100 controlling turning off or turning on of a sending port based on the generated control signal, and generating an electrical signal corresponding to the control signal.

The near-end device 200 diagnosing the physical downlink failure according to the reported signal includes:

converting the reported signal into a received code based on the appointed frequency clock; determining information corresponding to the received code based on the stored corresponding relationship between the information and the code; and diagnosing the physical downlink failure according to the determined information.

In the embodiment of the present invention, an apparatus for reporting information can be structured according to the above method thr diagnosing the physical downlink failure. The apparatus can be used in a remote device of the wireless network, and, referring to FIG. 4, comprises a determining unit 410, a generating unit 420 and a reporting unit 430.

Figure 4:
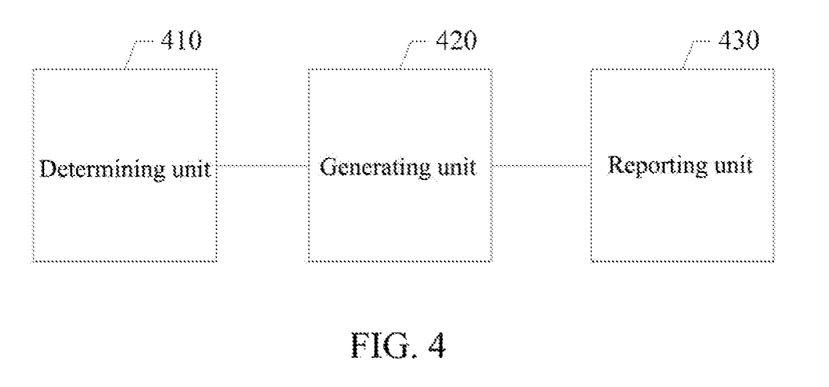
FIG. 4 is a block diagram of an apparatus for reporting information according to an embodiment of the present invention.

The determining unit 410 is configured to, when the remote device detects the physical downlink failure, determine a code corresponding to information to be reported based on the stored corresponding relationship between the information and the code.

The generating unit 420 is configured to generate a control signal from the determined code based on the appointed frequency clock.

The reporting unit 430 is configured to report a signal corresponding to the control signal to the near-end device through the physical uplink.

Moreover, the determining unit 410 is further configured to, when the physical downlink is an optical fiber link, determine whether the failure occurs in the physical link based on whether a optical receiving module receives an optical signal.

The determining unit 410 is further configured to, when the physical downlink is a cable link, determine whether the failure occurs in the physical link by detecting an electrical signal of a receiving port.

The reporting unit 430 is further configured to, when the physical uplink is an optical fiber link, control turning off or turning on of an optical sending module based on the generated control signal and generate the optical signal corresponding to the control signal.

The reporting unit 430 is further configured when the physical uplink is a cable link, control turning off or turning on of a sending port based on the generated control signal and generate the electrical signal corresponding to the control signal.

Of course, an apparatus for diagnosing a physical downlink failure is further provided in an embodiment of the present invention. The apparatus can be used in a near-end device of the wireless network, and, referring to FIG. 5, comprises a conversion unit 510, a determining unit 520 and a diagnosis unit 530.

Figure 5:
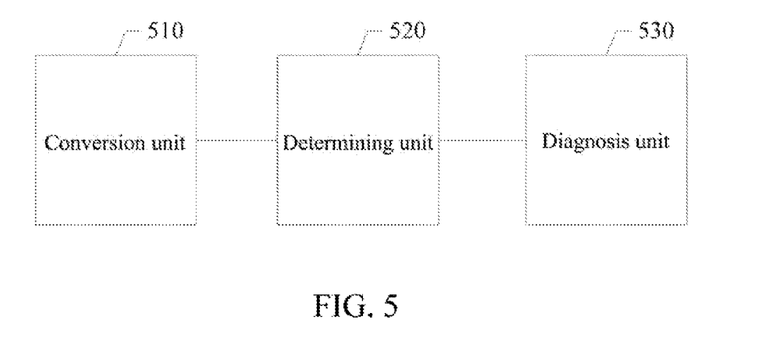
FIG. 5 is a block diagram of an apparatus for diagnosing a physical downlink failure according to an embodiment of the present invention.

The conversion unit 510 is configured to convert the received control signal into the received code based on the appointed frequency clock.

The determining unit 520 is configured to determine information corresponding to the received code based on the stored corresponding relationship between the information and the code.

The diagnosis unit 530 is configured to diagnose the physical downlink failure according to the determined information.

The embodiment of the present invention is further described in detail in conjunction with the accompanying drawings hereinafter.

Figure 6:
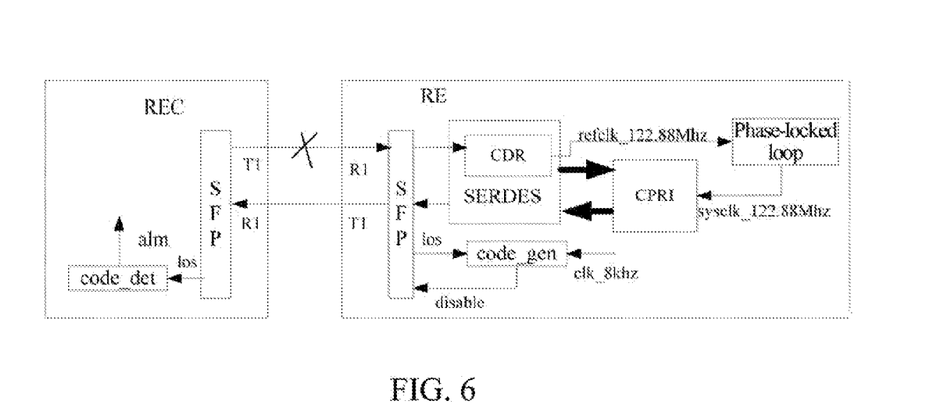
FIG. 6 is a system structure diagram of a wireless communication network in the first embodiment of the present invention.

The first embodiment of the present invention is described by taking a system interconnected via a common public radio interface (CPRI) as an example. Referring to FIG. 6, the wireless communication network includes a radio device control (REC) and a radio device (RE), wherein the REC is a near-end device and the RE is a remote device.

The REC and the RE are interconnected by using an optical fiber and an optical module. The line rate is 1.2288 Gbps and the CPRI standard interface is used. Thus, when the optical fiber downlink is normal, the RE recovers a line clock, the frequency of which is 122.88 MHz, from the receiving link clock data recovery (CDR), and the line clock is used as an input reference clock of a local phase-locked loop. So the 122.88 MHz system clock generated by the local phase-locked loop is used as a sending clock for sending data.

When the failure occurs in the optical fiber downlink, since the CDR is unable to normally recover the line clock, its phase-locked loop loses lock due to loss of the reference clock. Thus, its system clock will not be stable and have the same frequency and same phase as the sending clock of the near-end device. Thus, data sent out by the CDR will not be able to be received correctly by the near-end device REC, and the CPRI frame loses lock when the near-end device REC receives the data. At this point all uplink information, including alarm information, not be able to be transmitted correctly.

Therefore, in the embodiment of the present invention, the remote device RE sends the signal corresponding to the reported information by using the appointed frequency clock such that the near-end device can diagnose the physical downlink failure according to the reported signal. Here the appointed frequency clock is an appointed low frequency clock, which makes it easy for the near-end device REC to receive and analyze the signal.

SFP in FIG. 6 is an optical module configured to receive or send an optical signal. LOS is an optical signal loss indication signal. When LOS is at high level, signal loss is indicated. Disable is a control signal used for controlling turning off and turning on of SFP, and the high level controls turning off. In the normal case, LOS and Disable signals of optical modules in the near-end device and the remote device are in an invalid status, that is, all are '0'.

The remote device RE includes a code_gen module configured to generate a corresponding control signal Disable from the codes representing different information based on the appointed low frequency clock, and use the control signal Disable to turn on or turn of SFP so as to report the corresponding signal.

The near-end device REC includes a code_det module configured to detect a signal received by SFP based on the appointed low frequency clock, that is, detect whether there is an indication (LOS) in the signal received by SFP, obtain the corresponding code, and decode and recover the corresponding original information, that is, determine the information corresponding to the code, based on the stored corresponding relationship between the information and the code so as to diagnose the physical downlink failure.

In the wireless network shown in FIG. 6, the process for diagnosing the optical fiber downlink failure will be described below.

Figure 7:
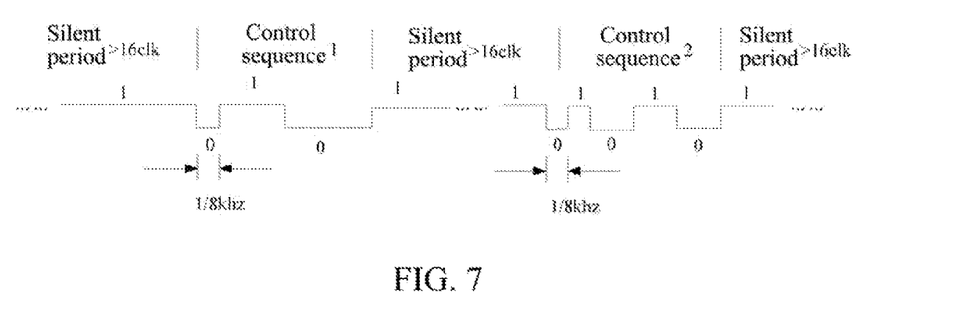
FIG. 7 is a schematic diagram of a control signal generated in the first embodiment of the present invention.

When the failure occurs in the optical fiber downlink, a LOS indication of the optical module SFP in the remote device RE becomes a high level. After detecting this, the remote device firstly determines the code corresponding to the reported information based the stored corresponding relationship between the information and the code. For example, the reported information is two pieces of information and their corresponding codes are "01110000" and "01001100" respectively. Then, a code_gen module of a remote device RE generates control signals from the determined codes by using a low frequency clock, the frequency of which may be 8 KHz. Two control signals, i.e., control sequence 1 and control sequence 2 as shown in the FIG. 7, are generated from codes "01110000" and "01001100". Finally, the control sequences are used to control turning on and turning off of the optical module SFP to report the corresponding signals. Here, the high level is turning off the SFP. When the code is "01001100", its corresponding reported signal means that the optical signal is sent in a duration of ⅛ khz; the optical signal is turned off in a duration of ⅛ khz; the optical signal is sent in a duration of ⅔ khz; the optical signal is turned off in a duration of ⅔ khz; the optical signal is sent in a duration of ⅔ khz.

In the embodiment of the present invention, there is two pieces of information required to be reported. Therefore, a silent period of enough time is retained between the reports of the two pieces of information. As shown in FIG. 7, more than 16 CLKs are used, during which the sending of the optical signal is always turned off, which make it easy for the near-end device REC to perform monitoring and decoding.

The optical module SFP of the remote device RE turns off and on the sending of the optical signal according to the control sequence. At this point, the optical signal received by the optical module SFP of the near-end device REC appears or disappears from time to time and the control sequence which is the same as the control signal of the optical module SFP of the remote device RE will occur in its LOS indication signal. The code_det module of the near-end device RE converts the detected control sequence into corresponding received code by using the appointed low frequency clock, and then finds out information corresponding to the received code, that is, recovers the original reported information based on the stored corresponding relationship between the information and the code.

In conclusion, in the embodiment of the present invention, the remote device, when detecting the physical downlink failure, determines the code corresponding to the information to be reported based on the stored corresponding relationship between the information and the code, generates the control signal from the determined code based on the appointed frequency clock, and reports the signal corresponding to the control signal to the near-end device through the physical uplink such that the near-end device can diagnose the physical downlink failure according to the reported signal. Thus the remote device, when detecting the physical downlink failure, can report the failure information or some other important information to the near-end device immediately. Therefore, the near-end device can determine that the failure occurs in the physical link based on the reported information, diagnoses and processes the failure in time, and recovers the normal operation of the physical downlink to reduce the time during which the normal operation of the system is influenced.

Obviously, various modifications and variations to the present invention may be made by those skilled in the art without departing from the spirit and scope of the present invention. Thus, if these modifications and variations to the present invention are covered within the scope of the appended claims of the present invention and its equivalent technology, then the present invention is intended to include these modifications and variations.

I claim:

1. A method for diagnosing a physical downlink failure comprising:
when a remote device detects the physical downlink failure, determining a code corresponding to information required to be reported based on a stored corresponding relationship between the information and the code; wherein the code is a predefined binary code that represents the information helping for failure diagnosing;
the remote device generating a control signal from the determined code based on a predetermined low frequency clock; and
the remote device reporting a signal corresponding to the control signal to a near-end device through a physical uplink such that the near-end device diagnoses the physical downlink failure according to the reported signal;
wherein the near-end device diagnosing the physical downlink failure based on the reported signal includes:
converting the reported signal into a received code based on the predetermined low frequency clock;
determining information corresponding to the received code based on the stored corresponding relationship between the information and the code; and
diagnosing the physical downlink failure based on the determined information.

2. The method according to claim 1, wherein the remote device reporting the signal corresponding to the control signal to the near-end device through the physical uplink includes:
when the physical uplink is an optical fiber link, the remote device controlling turning off or turning on of a optical sending module based on the control signal, and generating an optical signal corresponding to the control signal; and
when the physical uplink is a cable link, the remote device controlling turning off or turning on of a sending port based on the control signal, and generating an electrical signal corresponding to the control signal.

3. A system for diagnosing a physical downlink failure comprising a remote device and a near-end device; wherein
the remote device is configured to, when detecting the physical downlink failure, determine a code corresponding to information required to be reported based on a stored corresponding relationship between the information and the code, generate a control signal from the determined code based on a predetermined low frequency clock and report a signal corresponding to the control signal to a near-end device through a physical uplink; wherein the code is a predefined binary code that represents the information helping for failure diagnosing; and
the near-end device is configured to diagnose the physical downlink failure according to the reported signal;
wherein the near-end device is further configured to, in the case that the physical downlink failure is diagnosed based on the reported signal, convert the reported signal into a received code based on the predetermined low frequency clock;

determine information corresponding to the received code based on the stored corresponding relationship between the information and the code; and diagnose the physical downlink failure based on the determined information.

4. The system according to claim 3, wherein the remote device is further configured to, in the case that the signal corresponding to the control signal is reported to the near-end device through the physical uplink, when the physical uplink is an optical fiber link, control turning off or turning on of a optical sending module based on the control signal, and generating an optical signal corresponding to the control signal; and when the physical uplink is a cable link, control turning off or turning on of a sending port based on the control signal, and generating an electrical signal corresponding to the control signal.

* * * * *